United States Patent [19]

Mortimore

[11] Patent Number: 4,798,436

[45] Date of Patent: Jan. 17, 1989

[54] OPTICAL FUSED COUPLERS

[75] Inventor: David B. Mortimore, Felixstowe, England

[73] Assignee: British Telecommunications, plc, London, England

[21] Appl. No.: 33,102

[22] PCT Filed: Jul. 25, 1986

[86] PCT No.: PCT/GB86/00445

§ 371 Date: Mar. 20, 1987

§ 102(e) Date: Mar. 20, 1987

[87] PCT Pub. No.: WO87/00934

PCT Pub. Date: Feb. 12, 1987

[30] Foreign Application Priority Data

Jul. 30, 1985 [GB] United Kingdom ................. 8519183

[51] Int. Cl.$^4$ ................................................ G02B 6/26
[52] U.S. Cl. .................................... 350/96.15; 350/320
[58] Field of Search .................... 350/96.15, 96.17, 320

[56] References Cited

U.S. PATENT DOCUMENTS

| 4,315,666 | 2/1982 | Hicks, Jr. ........................ | 350/96.15 |
| 4,342,499 | 8/1982 | Hicks, Jr. ........................ | 350/96.15 |
| 4,439,221 | 3/1984 | Smyth et al. ..................... | 65/4.21 |
| 4,449,781 | 5/1984 | Lightstone ....................... | 350/96.15 |
| 4,586,784 | 6/1986 | Tremblay et al. .................. | 350/96.15 |
| 4,591,372 | 5/1986 | Bricheno et al. .................. | 350/96.15 X |

FOREIGN PATENT DOCUMENTS

12120/83 9/1983 Australia .
0176178 4/1986 European Pat. Off. .

OTHER PUBLICATIONS

CA,A,1143973 Minister of National Defence Canada 4/5/83, p. 5, lines 1028.
CA,A,1118621 Minister of National Defence Canada 2/23/82.
Optics Letters, vol. 10, No. 2, Jan. 1985, Optical Society of American (N.Y. U.S.) R. G. Lamont et al.: "Tuned--Port Twin Biconical-Taper Fiber . . . " pp. 46–68.
Optics Letters, vol. 7, No. 10, Oct. 1982, Optical Society of America, (N.Y., U.S.), Y. Tremblay et al.: "Modal-Insensitive Biconical-Taper Couplers", pp. 506–508.
Gould, Inc. "Wavelength-Dependent Coupling in Single-Mode Fused Biconical Taper Couplers".

Primary Examiner—John D. Lee
Assistant Examiner—Phan Heartney
Attorney, Agent, or Firm—Nixon & Vanderhye

[57] ABSTRACT

A fused optical fibre coupler in which one of the fibres has a propagation constant which in the coupling region is slightly different from that of the other. The propagation constant difference can be arranged to provide selected splitting ratios over a relatively wide wavelength range.

26 Claims, 3 Drawing Sheets

SPECTRAL RESPONSE OF STANDARD FUSED COUPLER.

SPECTRAL RESPONSE OF STANDARD FUSED COUPLER.

SPECTRAL LOSS CURVES FOR
(a) PORT 1 TO 3.
(b) PORT 1 TO 4.

OPTICAL FUSED COUPLERS

FIELD OF THE INVENTION

This invention relates to optical fibre couplers. The invention has particular but not exclusive application to fused optical fibre couplers.

BACKGROUND OF THE INVENTION

A fused optical fibre coupler can be formed by taking two or more optical fibres, twisting them around each other a few times, and heating the twisted portion while pulling so that the fibres along that portion taper and fuse together. In a coupler of this type light signals propagating in say one of a number of optical fibres can be coupled into a number of other fibres. An example of the way in which fused optical fibre couplers can be formed is described in European Patent Application No. 174014 (Hitachi)

Fused optical fibre couplers are attractive for use in optical fibre communications networks because they have low loss, good temperature stability, mechanical rigidity and ease of manufacture. However the coupling ratio of these devices is wavelength dependent. For example in a coupler where say one port couples to two ports, the splitting ratio between the two receiver fibres may be 50/50% AT 1.3 $\mu$m and anywhere between 80% to 20% and 99% to 1% at 1.52 $\mu$m depending upon whether the fibres are lightly fused or well fused. There is clearly a need for an optical fibre coupler in which the splitting ratio is not critically wavelength dependent and it is an object of the present invention to provide such a coupler.

According to one aspect of the present invention there is provided an optical fibre coupler in which light propagating in one fibre is arranged to be coupled into one or more other fibres, wherein the propagation constant of the receptor fibre or fibres in the coupling region is arranged to differ slightly from that of the one fibre. The propagation constant of an optical fibre is a characteristic which can be defined, for optical radiation of a given wavelength propagation in the fibre, as the angular frequency divided by the velocity of a point of constant phase within the fibre.

It has been found that in a coupling between two fibres of slightly different propagation constant the maximum coupled power from one fibre to the other can be made to have a value less than 100%. By appropriately selecting the difference in propagation constant the maximum coupled power can be arranged to have for example a value of 50%. Furthermore at the maximum value the variation of coupled power with wavelength is at its least sensitive so that the coupler will have that maximum coupling value over a relatively wide operating wavelength range. Thus it is possible to construct an optical fibre coupler in which light propagating in one fibre is split into two fibres with the splitting ratio between the two receptor fibres being essentially constant over a relatively wide operating wavelength range.

The difference in propagation constant can be achieved by using fibres of different diameter or fibres of different profile or by tapering one of two identical fibres more than the other. The coupler may be a fused fiber coupler.

According to another aspect of the present invention there is provided a method of forming a fused optical fibre coupler in which two fibres are twisted together along a portion of their length, the propagation constants of the fibres in the twisted region being slightly different, optical radiation is launched into one or both of said fibres whilst the twisted region is heated and pulled, and the optical radiation transmitted through the coupling region is monitored.

DESCRIPTION OF THE DRAWINGS

The invention will be described now by way of example only with particular reference to the accompanying drawings. In the drawings.

DETAILED DESCRIPTION

The invention will be exemplified by reference to fused optical fibre couplers although its application is not restricted to such couplers.

Figure 1:
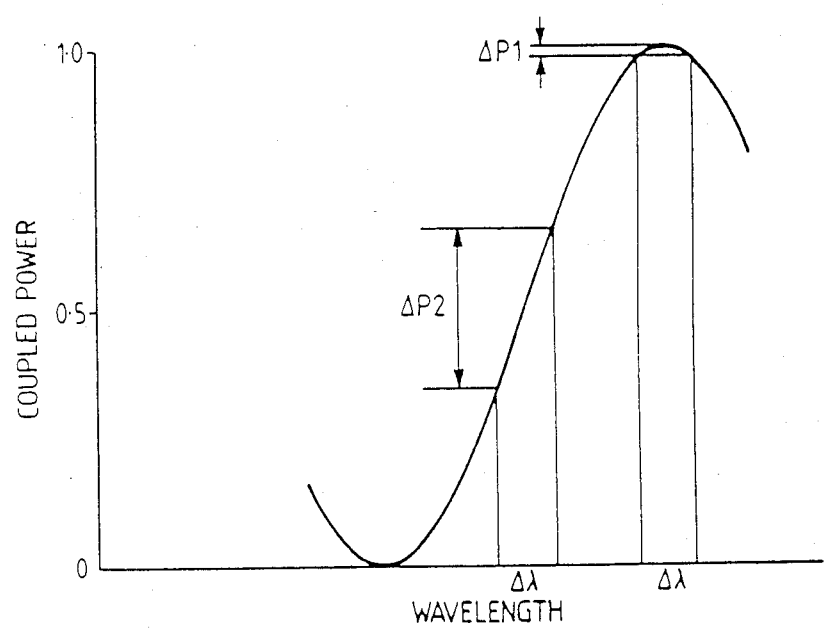
FIG. 1 illustrates the spectral response of a typical known fused optical fibre coupler.

FIG. 1 of the drawings shows the wavelength response of a typical known fused optical fibre coupler. The curve applies to a coupling between two optical fibres which have the same propagation constant and in which at its maximum the coupled optical power is substantially 100%. This figure shows that the variation of coupled power with wavelength is a maximum when the coupler is fabricated to have approximately 50% coupling at a particular wavelength. It can be seen from FIG. 1 that a wavelength change $\Delta$ in the region of maximum coupled power produces a relatively small change $\Delta P1$ in coupled power whilst the same wavelength change in the region of 50% coupled power produces a much larger variation in coupled power $\Delta P2$. Thus provided the device is operating at or in the region of the maximum coupled power small changes of wavelength do not have a serious effect. This, however, is not always the case. Consider a device which comprises two fibres fused together to form a 2×2 port device. The effect of wavelength changes can be considered with reference to FIG. 2a which shows the variation of coupled power with coupler length. It is desirable in a 2×2 port device to have approximately a 50/50 split of power coupled to the two receptor fibres. If the coupler has been drawn in fabrication so that the 50/50 split occurs at 1.52 $\mu$m then it can be seen from line 12 on FIG. 2a that at 1.3 $\mu$m the splitting ratio would be considerable different. This is clearly not satisfactory for operation in a network which needs to operate at both 1.52 $\mu$m and 1.3 $\mu$m.

In the present technique an optical fibre coupler is fabricated by fusing the coupling region between two optical fibres which in the coupling region have slightly different propagation constants when measured at a given wavelength. The difference in propagation constant can be achieved by arranging the receptor fibres to have a different diameter, or a different profile, or by tapering one of two identical fibres more than the other. In an example of the present technique the coupler has been fabricated by pre-tapering one of the fibres. The actual fusing technique will not be described in detail but can be for example the method described in Application No. 174014 The difference in propagation constant can be selected to produce a selected degree of coupling power. It is possible using this technique to produce for example, a 2×2 port device in which approximately 50/50% split of optical power can be achieved with radiation of both 1.3 μm and 1.52 μm.

To illustrate the effects of fabricating a 2×2 port fused fibre coupler with fibre of different propagation constants two different tapers, taper A and taper B, were produced. Each taper had a gaussian type diameter variation described by $$D(Z) = D_{max} - Do\, Exp\,(-aZ^2)$$

where D(Z) is the fibre diameter at a position Zmm, Dmax is the diameter of the untapered fibre (125 μm), Do is the reduction in fibre diameter at the waist of the taper and a is a taper length parameter. For the tapers A and B, Do equals 9 and 15 μm and a equals 0.037 and 0.035 mm² respectively.

Figure 2:
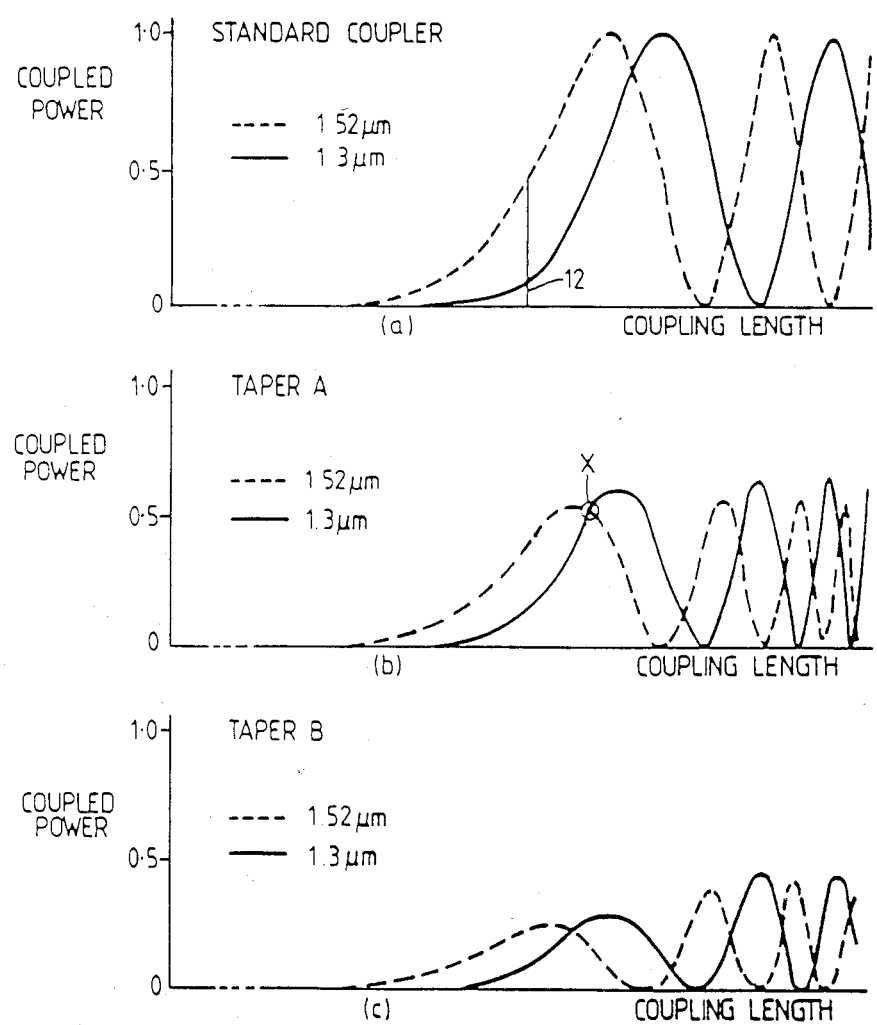
FIG. 2 is a series of curves showing a comparison of coupling power response curves for various fused optical fibre couplers.

The tapers were twisted with untapered fibre of constant diameter and the pairs heated and pulled in a manner similar to the method described in European Application No. 174014 The coupling process was monitored throughout the pulling operation by launching 1.3 μm and 1.52 μm radiation into an input port and by measuring the power at these wavelengths in both output ports. The coupling power response curves for the two tapers are shown in FIGS. 2b and 2c respectively. It will be seen that these curves show that the fibres were pulled further than the normal stopping point to demonstrate the coupling behaviour over a large coupler length range. It can be seen that the difference in propagation constant produced by the taper leads to incomplete power transfer between the fibres. The larger this difference the smaller is the total power transferred as shown by comparison of FIGS. 2a and 2b.

It can be seen from FIG. 2b that at the first region of intersection marked X of the 1.3 and 1.5 μm curves the coupler has an equal coupling ratio at both wavelengths. Furthermore this coupling ratio can be selected by appropriately choosing the magnitude of the propagation constant difference. For a 2×2 port device the pulling step is stopped at a length corresponding to the region X. During fabrication the region X is identified by monitoring radiation of both 1.3 and 1.52 μm. For a device produced using taper A a coupling of 50%±9% can be achieved over a wavelength range 1.23 to 1.57 μm.

To demonstrate the fabrication of a 50/50% coupling device using this technique, a taper similar to A was produced and pulled with standard fibre until equal coupling at both wavelengths was obtained, ≃50%. The fused region was then protected by potting in a slotted silica rod using a silicone rubber compound. Cutback measurements of coupling and excess loss were then made at the two wavelengths:

C=49.9%, C=50.1%, Excess loss=0.014 dB @ 1.3 μm

C=52.2%, C=47.8%, Excess loss=0.11 dB @ 1.52 μm

Figure 3:
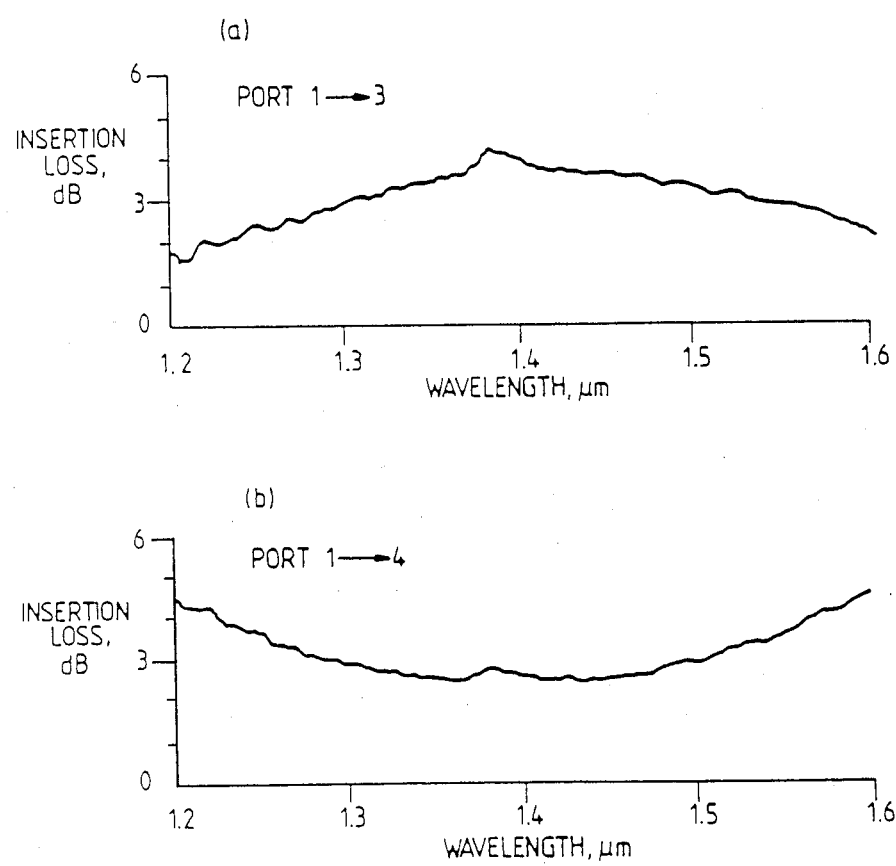
FIG. 3 shows spectral loss curves for couplers in accordance with the present invention.

FIG. 3a and 3b show cutback spectral loss measurements from input port 1 to output ports 3 and 4 respectively. The wavelength window for an insertion loss of 3 dB±0.7 dB is over 300 nm.

I claim:

1. A method of forming an optical fibre coupler in which light propagating in one fibre is arranged to be coupled into one or more other fibres within a coupling region and at a predetermined coupling ratio comprising the steps of:
   a. preselecting said optical fibres such that the propagating constant of said one fibre within the coupling region is slightly different from the others of said fibres,
   b. increasing the length of said coupling region,
   c. monitoring the coupler being formed during the increase in the length of the coupling region; and
   d. stopping the increase in the length when the coupling ratios for two preselected wavelengths are first equal, the optical fibres being such that the coupling ratio at said two preselected wavelengths is equal to said predetermined coupling ratio.

2. A method of forming an optical coupler as claimed in claim 1 in which optical radiation at one of said preselected wavelengths is launched into at least one of said fibres and the optical radiation transmitted through the coupling region is monitored.

3. A method of forming an optical coupler as claimed in claim 2 in which optical radiation at both of said preselected wavelengths is launched into at least one of said fibres and both wavelengths are monitored.

4. A method of forming an optical coupler as claimed in claim 1 in which two fibres are twisted together along a portion of their length, the fibres are heated and said coupling length increased by pulling.

5. A method of forming an optical coupler as claimed in any preceding claim in which the difference in propagation constant is achieved using fibres of different core diameter.

6. A method of forming an optical coupler as claimed in any one of claims 1 to 4 in which the difference in propagation constant is achieved by using fibres of different refractive index profiles.

7. A method of forming an optical coupler as claimed in any one of claims 1 to 4 in which the difference in propagation constant is achieved by tapering one of two identical fibres more than the other.

8. A method of forming an optical coupler as claimed in any one of claims 1 to 4 in which said predetermined coupling ratio is substantially less than or equal to 50:50.

9. A method of forming an optical coupler as claimed in claim 7 in which each taper has a gaussian type diameter variation given by $$D(Z) = Dmax - Do\, Exp\,(-aZ^2)$$

where D(z) is the fibre diameter at a position Zmm;
Dmax is the diameter of the untapered fibre;
Do is the reduction in fibre diameter at the waist of the taper; and
a is the taper length parameter.

10. A method of forming a coupler as claimed in claim 9 in which the taper of one fibre has Do=9 μm, a=0.37 mm and Dmax=125 μm and the taper of the other fibre has Do=15 μm, a=0.035 mm² and Dmax=125 μm, and in which the predetermined coupling ratio is 50%, whereby a coupler wavelength flattened between 1.3 μm and 1.52 μm is obtainable.

11. An optical coupler formed by the method of forming an optical fibre coupler in which light propagating in one fibre is arranged to be coupled into one or more other fibres within a coupling region and at a predetermined coupling ratio comprising the steps of:
   a. preselecting said optical fibres such that the propagating constant of said one fibre within the coupling region is slightly different from the other of said fibres,
b. increasing the length of said coupling region,
c. monitoring the coupler being formed during the increase in the length of the coupling region; and
d. stopping the increase in length when the coupling ratios for two preselected wavelengths are first equal, the optical fibres being such that the coupling ratio at said two preselected wavelengths is equal to said predetermined coupling ratio.

12. An optical coupler as claimed in claim 11 in which two fibres are twisted together along a portion of their length, the fibres are heated and said coupling length increased by pulling.

13. An optical coupler as claimed in claim 11 in which the difference in propagation constant is achieved using fibres of different core diameter.

14. An optical coupler as claimed in claim 11 in which the difference in propagation constant is achieved by using fibres of different refractive index profiles.

15. An optical coupler as claimed in claim 11 in which the difference in propagation constant is achieved by tapering one of two identical fibres more than the other.

16. An optical coupler as claimed in claim 15 in which each taper has a gaussian type diameter variation given by $$D(Z) = Dmax - Do \; Exp\,(-aZ^2)$$

where $D(z)$ is the fibre diameter at a position Zmm;
Dmax is the diameter of the untapered fibre;
Do is the reduction in fibre diameter at the waist of the taper; and
a is the taper length parameter.

17. An optical coupler as claimed in any one of claims 11 to 15 and 16 in which said predetermined coupling ratio is substantially less than or equal to 50:50.

18. An optical coupler as claimed in claim 16 in which the taper of one fibre has Do=9 μm, a=0.37 mm and Dmax=125 μm and the taper of the other fibre has Do=15 μm, a=0.035mm² and Dmax=125 μm, and in which the predetermined coupling ratio is 50%, whereby a coupler wavelength flattened between 1.3 μm and 1.52 μm is obtainable.

19. A broadband optical coupler having a coupling region in which light propagating in one fibre is coupled into one or more other fibres, the propagation constant within said coupling region of said fibre differing slightly from those of the other fibres, said coupling region having a predetermined length, said predetermined length being equal to the minimum distance for which the coupling ratio at two preselected wavelengths is first equal during formation of the coupler.

20. An optical fibre coupler as claimed in claim 19 in which the difference in propagation constant is achieved using fibres of different core diameter.

21. An optical fibre coupler as claimed in claim 19 in which the difference in propagation constant is achieved using fibres of different refractive index profile.

22. An optical fibre coupler as claimed in claim 19 in which the difference in propagation constant is achieved by tapering one of two identical fibres more than the other.

23. An optical fibre coupler as claimed in claim 22 in which each taper has a gaussian type diameter variation given by $$D(Z) = Dmax - Do \; Exp\,(-aZ^2)$$

where $D(Z)$ is the fibre diameter at a position Zmm;
Dmax is the diameter of the untapered fibre;
Do is the reduction in fibre diameter at the waist of the taper; and
a is the taper length parameter.

24. An optical fibre coupler as claimed in claim 23 in which the taper of one fibre has Do=9 μm, a=0.037 mm and Dmax=125 μm and the taper of the other fibre has Do=15 μm, a= 0.035 mm² and Dmax=125 μm, and in which the predetermined coupling ratio is 50%; whereby a coupler wavelength flattened between 1.3 μm and 1.52 μm is obtainable.

25. An optical fibre coupler as claimed in any of claims 11 and 19 to 24 in which the coupler is a fused fibre coupler.

26. An optical fibre coupler as claimed in any of claims 19 to 23 in which coupling ratio at the two preselected wavelengths is less than or equal to 50%.

* * * * *